2,984,687

CATALYTIC PROCESS FOR N-ALKYLATION OF AMINES

Donald L. Esmay, Minneapolis, Minn., and Peter Fotis, Jr., Highland, Ind., assignors to Standard Oil Company, Chicago, Ill., a corporation of Indiana No Drawing. Filed Apr. 27, 1956, Ser. No. 581,002

16 Claims. (Cl. 260—577)

This invention relates to an improved process for the alkylation of a nitrogen atom of an ammonia-type compound containing at least one N-H bond, i.e. N-alkylation of primary and secondary amines with certain alkenes in the presence of alkali metals or their alloys or hydrides extended upon inert supporting materials, especially activated alumina or activated carbon.

It has long been an objective of the petroleum industry to convert the simplest compounds containing ethylenic unsaturation, viz. alkenes and cycloalkenes, to amines by reaction with primary or secondary amines. The reaction in question can be formulated as shown in the following equation:

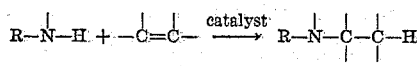

wherein R is an organic radical. The alkali metals, particularly sodium, have been found to catalyze the desired reaction (G.M. Whitman, U.S.P. 2,501,556, granted March 21, 1950, and W. F. Gresham, U.S.P. 2,501,509, granted on the same date; B W. Howk et al., "Alkali Metal-Catalyzed Amination of Olefins," J. Am. Chem. Soc. 76, 1899–1902 (April 5, 1954)). The prior art processes required the use of high pressures. Thus, although one of the aforementioned patents states that amination of ethylene can proceed at pressures of 100 atmospheres or more in the presence of a liquid diluent and the other patent alleges amination of alkenes proceeds only at pressures above 225 atmospheres, the A.C.S. publication indicates the need of pressures above about 400 atmospheres and the best results were apparently obtained in the range of 800 to 1000 atmospheres.

We have discovered a simple N-alkylation process of the character aforesaid which operates efficiently, sometimes quantitatively, at pressures below 100 atmospheres, employing a cheap and simple catalyst, e.g., an alkali metal such as sodium extended upon a substantially inert supporting material such as activated alumina or activated charcoal. Our invention represents an enormous advance in the art since our low pressure process permits the use of continuous reaction equipment which can be cheaply fabricated and operated; the known high pressure processes pose special chemical engineering problems in plant fabrication, plant operation and require large capital investment with large depreciation of plant.

One object of our invention is to provide a catalytic process for the N-ethylation or N-alkylation of amines containing an N-H group, i.e., primary amines or secondary amines, with ethylene. Another object is to provide a catalytic process as aforesaid in which low operating pressures below 100 atmospheres can be used and in which the yields of alkylate fall within the range of about 80 to 100% of the theoretical value. Another object is to provide a cheap catalytic process for the amination of alkenes and cycloalkenes. An additional object is to provide new catalysts for N-alkylation processes of the character aforesaid. These and other objects of our invention will be apparent from the following description of our invention.

The catalysts used in our process are alkali reagents selected from the class consisting of alkali metals or their hydrides, the catalysts being supported on substantially inert solid materials. The alkali metals are, of course, the group consisting of lithium, sodium, potassium, rubidium and cesium. We may also employ mixtures of alkali metals or alloys of alkali metals with other metals in preparing catalysts. A particularly suitable type of alloy which is commercially available is the so-called Nack alloy which is the Na-K alloy containing about 40 to 90 weight percent of K, usually about 67%.

Examples of inert solid catalyst supports are activated carbons such as activated charcoal, particularly activated charcoals prepared from cellulosic materials such as coconut, although wood charcoals and other carbons may be used. The adsorbent carbons or activated carbons which we may employ to prepare catalysts have high surface areas, usually between about 700 and about 1200 square meters per gram, relatively large pore volumes, for example, about 0.53 to about 0.58 cc. per gram, and relatively large pore diameters, for example, about 20 to 30 A. units and, in some instances, contain small amounts of combined oxygen. If desired, the activated carbon can be pretreated with nitric acid as described in E. F. Peters U.S.P. 2,692,295, although this pretreatment is not essential to obtain active catalysts for our purposes.

The activated alumina, which are one of the preferred supporting materials for the preparation of our catalysts, are articles of commerce which are known to be members of the gamma-alumina family, including the so-called eta-alumina (note, for example, P. J. Nahin et al., Ind. Eng. Chem., 2021 (1949); H. C. Stumpf et al., Ind. Eng. Chem. 42, 1398–1403 (1950); M. K. B. Day et al., J. Phys. Chem. 57, 946–950 (Dec. 1953); J. F. Brown et al., J. Chem. Soc. 1953, 84). Suitable alumina-containing adsorbent materials have BET surface areas in the range of about 100 to about 700 square meters per gram, more often about 150 to 300 square meters per gram, and average pore radius of about 10 to 100 A., usually of the order of about 25 A. Relatively low surface area aluminas such as alpha- or beta-aluminas cannot be employed to prepare catalysts for the purpose of this invention. We prefer to use gamma-aluminas and can use eta-alumina, which is a member of the gamma-alumina family.

The catalyst support may comprise or consist essentially of magnesia, titania, zirconia; suitable metal fluorides such as alkali metal fluorides, alkaline earth metal fluorides, cryolite, $AlF_3$, $K_3AlF_6$ and the like. Other suitable supports are the well-known dehydrogenation or hydroforming catalysts, e.g. solid catalysts comprising about 1 to about 25% by weight of the oxides of one or more transition metals of Groups 5 and 6 of the periodic system in combination with activated alumina, titania, zirconia or the like, particularly a solid comprising about 1 to 10% by weight of $MoO_3$ supported on gamma-alumina.

It is essential that the solid supporting material be unreactive with the alkali reagent catalyst under the alkylation conditions. Thus, acidic 90 weight percent silica-10 weight percent alumina can not be used for the purposes of our invention since this (and similar) materials react with alkali metals, possibly because of the presence of surface-OH groups.

The extension of the alkali metal on the supporting material can be effected by any known method and does not form part of the present invention. For example, the dispersion of alkali metal on the support may be effected by melting the alkali metal onto the heated support, employed in the form of a powder, in the presence of a fluidizing stream of an inert gas such as helium, which serves to maintain the particles of supporting material in the form of an agitated or fluidized bed. The alkali metal may be dispersed onto the support in the absence of a fluidizing gas, while effecting agitation of the particles of supporting material by conventional mixing techniques. Another technique involves contacting a dispersion of alkali metal in a hydrocarbon medium with particles of the supporting material. Other methods for distributing alkali metals on solid supports may also be employed, e.g. by absorption of sodium from its ammonia solutions by alumina or the like.

The resulting combination of alkali metal and support can be converted by contacting with hydrogen under suitable conditions which are well known in the art to produce the corresponding supported alkali metal hydride.

The concentration of alkali metal in the solid, substantially inert supporting material can range from about 1 to about 50% by weight, based on the weight of said supporting material, more often between about 5 and about 25% by weight. These ranges apply also to the alkali metal content of the alkali metal hydrides extended upon the inert supporting material.

The alkylation operations are effected at temperatures of about 100° C. to about 400° C., preferably about 200° C. to about 300° C.

The pressure during the alkylation operation can fall within the range of about 1 to 100 atmospheres, although it is usually unnecessary to exceed even 75 atmospheres in order to obtain conversions of the order of about 75 to 100% of the feed stock to desired products. Generally, N-alkylation can readily be carried on in the pressure range of about 50 to 75 atmospheres.

The nitrogen-containing charging stocks which can be employed in our process are basic nitrogen compounds containing at least one N-H bond, for example, primary or secondary amines. The amines can be aliphatic, aromatic or of mixed structural type. Examples of suitable primary amines are the alkyl amines, cycloalkyl amines or the like, e.g., methylamine, ethylamine, n-propylamine, isopropylamine, 2-aminopentane, dodecylamine, octylamine, octadecylamine, allylamine, cyclopentylamine, cyclohexylamine, benzylamine and the like; primary aryl amines such as iniline, toluidines, xylidines, alpha-naphthyl amine, beta-naphthyl amine and the like. Secondary amine feed stocks include, for example, dialkyl amines or N-alkyl, N-aryl amines, including dimethylamine, diethylamine, methylisopropyl amine, dibutylamine, N-methyl, N-cyclohexyl amine, N-methylaniline, N-methyl benzylamine, piperidine, pyrrolidine, carbazol and the like. The process of the present invention can be employed also to effect the introduction of ethyl groups into non-tertiary amino compounds containing more than one amino group, for example, ethylene diamine, diethylene triamine, triethylene tetramine, N-methyl, N'-methyl ethylene diamine and the like. We may also use feed stocks containing an N-H group and other functional groups, as in morpholine, salts of glycine or other amino acids, etc.

The ethylene charged to our process can be a commercial cylinder product, a petroleum refinery stream containing ethane, propane, propylene, etc. In the interests of conserving catalyst, it is desirable to purify ethylene feed stocks which contain catalyst-reactive impurities or poisons, e.g. water, carbon dioxide, hydrogen sulfide, mercaptans, acetylene, etc. Purification of the ethylene stream can be effected by known methods.

The process of the present invention can be effected in the liquid phase or vapor or gas phase, depending upon the reactants and the selected operating conditions. It is desirable to effect the operation of this invention in the presence of substantially inert diluents which remain liquid under the reaction conditions, for example, normally liquid saturated hydrocarbons or aromatic hydrocarbons, for example, pentane, hexane, heptane, octane, isooctane, dodecane; monocyclic, relatively low boiling aromatic hydrocarbons such as benzene, toluene, xylenes, ethylbenzene, mesitylene, and the like. Various amines can also be used as solvents, including the amine product of the desired reaction.

When the amination or alkylation is effected in the vapor phase, the catalyst can be employed in the form of a fluidized powder. Fluidized catalysts operations have become well known in industry, especially in petroleum refining, in which fluidized catalysts have been employed extensively in carrying out catalytic cracking of gas oils and hydroforming of naphthas. The specific fluidization techniques represent a well known aspect of chemical engineering practice and do not form part of the present invention. Fluidized operations afford the great advantages of substantially constant temperature in the reactor and permit removal of catalyst and its replacement without interrupting the catalytic operation.

The present process can also be effected by preparing a slurry of the solid catalyst in a liquid diluent and introducing the reactants therein while agitating at the selected temperature and pressure, thereby effecting either continuous or batch production of alkylation products.

Our invention is specifically exemplified hereinafter without the intent, however, of thereby limiting its broader scope.

In Table 1 the catalyst in Runs 1–4 was metallic sodium extended upon charcoal and activated alumina, being prepared in each case by contacting molten sodium with the solid supporting material while stirring. The catalyst was prepared in a helium atmosphere and transferred under helium to the reactor. In Run 5, lithium on $Al_2O_3$ was prepared in a stirred stainless steel tube under helium. All the alumina supports were in the 28–200 mesh/inch range and were prepared from $Al^0$ by the method of USP. 2,274,634 (Re. 22,196). The charcoal used in Run 1 was a commercial product (Burrell), 12–20 mesh/inch. The reactor in each instance was a stainless steel autoclave of 250 ml. capacity provided with a magnetically-actuated stirrup-type stirrer which was reciprocated through the reaction mixture (Magne-Dash reactor).

TABLE 1

*Ethylene alkylation*

| Run No. | 1 | 2 | 3 | 4 | 5 |
|---|---|---|---|---|---|
| Mols of Ethylene | 1.2 | 1.0 | 0.75 | 0.57 | 0.57 |
| Amine: | Phenyl | Phenyl | n-Hexyl | di-n-Butyl | Phenyl |
| mol | 1.1 | 1.1 | 0.57 | 0.45 | 1.1 |
| $n\ 20/D$ | 1.5858 | 1.5858 | 1.4184 | 1.4173 | 1.5858 |
| Metal: | Na | Na | Na | Na | Li |
| g. at. wt. | 0.09 | 0.04 | 0.05 | 0.05 | 0.07 |
| Support: | C | $Al_2O_3$ | $Al_2O_3$ | $Al_2O_3$ | $Al_2O_3$ |
| g | 10 | 10 | 10 | 10 | 10 |
| Temp., °C. | 262 | 262 | 200 | 175 | 295 |
| Pressure, p.s.i.g. | 1,000 | 1,200 | 1,200 | 1,000 | 1,300 |
| Pressure, atm. | 68 | 81.6 | 81.6 | 68 | 88.4 |
| Time, hrs. | 18 | 18 | 20 | 20 | 68 |
| Olefin Reacted, mol | 0.93 | 0.93 | ---------- | 0.214 | 0.465 |
| Amine Reacted, mol | 0.81 | 0.81 | 0.28 | 0.29 | 0.55 |
| Amine Reacted, mol percent on charge | 73.6 | 73.6 | 49 | 62.2 | 50 |
| Liquid Product, g | 103 | 112 | ---------- | ---------- | 103 |
| Liquid Product, $n\ 20/D$ | 1.5608 | 1.5599 | 1.4221 | 1.4250 | ---------- |
| Alkylate, ml. | 75 | 94 | 20 | 30 | 47 |
| N-Ethyl Alkylate, V. percent of Alkylate | 94 | 83 | ---------- | ---------- | 100 |
| Higher Alkylate, V. percent of Alkylate | 6 | 17 | ---------- | ---------- | 0 |

In Table 1 are presented data obtained in the ethylation of aniline, n-hexylamine and di-n-butylamine with ethylene in the presence of sodium and lithium extended upon inert supports. It will be noted that high conversions were obtained and that N-ethylaniline was produced in excellent yields.

TABLE 2

| Run No. | 6 | 7 |
|---|---|---|
| Olefin: | | |
| mol | $C_2$ | 2-butene |
| | 0.64 | 0.54 |
| Aniline, mol | 1.1 | 1.1 |
| Sodium, g. at. wt | 0.04 | 0.04 |
| Support: | SiO-$_2$Al$_2$O$_3$ a | Al$_2$O$_3$ |
| g | 10 | 10 |
| Temp., °C | 25 to 300 | 250 |
| Pressure, p.s.i.g | 1400 | 600 |
| Pressure, atm | 95.2 | 40.8 |
| Time, hrs | 20 | 23 |
| Olefin Reacted, mol | 0 | 0.15 |
| Liquid Product, g | | 86 |
| Liquid Product, n 20/D | | 1.5800 | a Nalcat product, 85 w. percent SiO$_2$ and 15 w. percent Al$_2$O$_3$.

The results presented in Table 2 stand in sharp contrast to the successful operations indicated in Table 1. Thus in Run 6, in which an acidic silica-alumina support was used for sodium, no alkylation of aniline by ethylene was obtained. In Run 7 it was shown that 2-butene reacts much more slowly than ethylene in the attempted alkylation of aniline. We recovered 76 mol percent of the aniline unchanged from the products of this run.

RUN 8

The process of Run 2 is repeated, but the Na is replaced by an equivalent amount of NaH and the alkylation products are worked up as before.

RUN 9

To a 250 ml. capacity autoclave was charged 80 ml. aniline together with a catalyst mixture comprising 1 gram sodium supported on 10 grams of 8 w.% molybdena-on-alumina. To the sealed autoclave were added 20 grams ethylene. The temperature was raised to 250° C. and the maximum observed pressure was 1400 p.s.i. After 18 hours the pressure had dropped to 400 p.s.i. After cooling, the pressure was released and 6 grams ethylene were recovered, indicating 70% conversion of ethylene. The liquid product was separated and distilled. That portion boiling at 183–187° C. at atmospheric pressure was considered to be recovered aniline. This fraction amounted to 30 ml., indicating conversion of 63% of the aniline charged. The residue consisted essentially of N-ethylanline, $N_D^{20}$ 1.5546, B.P. 83° C./20 mm.

There are many known uses for the alkylation products which can be produced by the process of the present invention. Thus the products may serve as feed stocks for the preparation of many derivatives useful in the synthesis of pharmaceuticals, insecticides, resins, salts, etc. One of the products which can be made easily in high yield by the process of the present invention, N-ethylaniline, can be dehydrogenated catalytically by known methods to produce indole. Indole finds use as a raw material for producing pharmaceuticals and can also be vinylated by known methods to produce a monomer for the preparation of synthetic resins. N,N-diethylanaline may be dehydrogenated to beta-ethylindole.

Having thus described our invention, what we claim is:

1. A process for the alkyation of the nitrogen atom of an amino hydrocarbon containing an N—H group, which process comprises reacting said amino hydrocarbon with ethylene in the presence of a catalyst consisting essentially of an alkali reagent selected from the class consisting of alkali metals and alkali metal hydrides, said alkali reagent being extended upon an inert particulate solid material, effecting said reaction under a total pressure below about 100 atmospheres and at an elevated temperature sufficient to effect substantial N-alkylation, and recovering an alkylated amine thus produced.

2. The process of claim 1 wherein reaction is effected at a temperature between about 100° C. and about 400° C. and a total pressure between about 1 and about 75 atmospheres.

3. The process of claim 1 wherein said reaction is effected at a temperature between about 200° C. and about 300° C. and a total pressure between about 50 atmospheres and about 75 atmospheres.

4. The process of claim 1 wherein said inert particulate solid material is an activated alumina.

5. The process of claim 1 wherein said inert particulate solid material is an activated carbon.

6. A process for the alkylation of the nitrogen atom of an amino hydrocarbon containing an N—H group, which process comprises reacting said amino hydrocarbon with ethylene in the presence of a catalyst consisting essentially of an alkali metal extended upon an inert particulate solid material, effecting said reaction under a total pressure below about 100 atmospheres and at an elevated temperature sufficient to effect substantial N-alkylation, and recovering an alkylated amine thus produced.

7. The process of claim 6 wherein said reaction is effected at a temperature between about 100° C. and about 400° C. and a total pressure between about 1 and about 75 atmospheres.

8. The process of claim 6 wherein said reaction is effected at a temperature between about 200° C. and about 300° C. and a total pressure between about 50 atmospheres and about 75 atmospheres.

9. A process for the alkylation of the nitrogen atom of an aromatic amino hydrocarbon containing an N—H group, which process comprises reacting said amino hydrocarbon with ethylene and a catalyst consisting essentially of sodium extended upon an inert particulate porous solid material of high surface area, effecting said reaction under a total pressure below 100 atmospheres and at a temperature between about 200° C. and about 300° C., and recovering an N-ethyl derivative of said aromatic amine.

10. The process of claim 9 wherein said aromatic amino hydrocarbon is aniline.

11. The process of claim 9 wherein said aromatic amino hydrocarbon is N-ethylaniline.

12. A process for the alkylation of the nitrogen atom of an alkyl amine containing an N—H group, which process comprises reacting said amine with ethylene and a catalyst consisting essentially of sodium extended upon an inert particulate porous solid material of high surface area, effecting said reaction under a total pressure below 100 atmospheres and at a temperature between about 200° C. and about 300° C., and recovering an N-ethyl derivative of said alkyl amine.

13. The process of claim 12 wherein said alkyl amine is n-hexylamine.

14. The process of claim 12 wherein said alkyl amine is di-n-butylamine.

15. A process for the alkylation of the nitrogen atom of an aromatic amino hydrocarbon containing an N—H group, which process comprises reacting said amino hydrocarbon with ethylene and a catalyst consisting essentially of sodium hydride extended upon an inert particulate porous solid material of high surface area, effecting said reaction under a total pressure below 100 atmospheres and at a temperature between about 200° C. and about 300° C., and recovering an N-ethyl derivative of said aromatic amino hydrocarbon.

16. A process for the alkylation of the nitrogen atom of an alkyl amine containing an N—H group, which process comprises reacting said amine with ethylene and a catalyst consisting essentially of sodium hydride extended upon an inert particulate porous solid material of high surface area, effecting said reaction under a total pressure below 100 atmospheres and at a temperature between about 200° C. and about 300° C., and recovering an N-ethyl derivative of said alkyl amine.

(References on following page)

References Cited in the file of this patent

UNITED STATES PATENTS

| | | |
|---|---|---|
| 2,115,884 | Schollkopf | May 3, 1938 |
| 2,449,644 | Danforth | Sept. 21, 1948 |
| 2,501,509 | Gresham | Mar. 21, 1950 |
| 2,501,556 | Whitman | Mar. 21, 1950 |
| 2,750,417 | Closson et al. | June 12, 1956 |

FOREIGN PATENTS

| | | |
|---|---|---|
| 313,934 | Great Britain | June 14, 1929 |
| 332,623 | Great Britain | July 22, 1930 |
| 414,574 | Great Britain | Aug. 9, 1934 |
| 461,783 | Canada | Dec. 13, 1949 |
| 527,960 | Germany | June 24, 1931 |
| 528,466 | Germany | July 1, 1931 |
| 917,060 | France | Sept. 2, 1946 |

OTHER REFERENCES

Howk et al.: JACS 76; 1899–1902 (1954).